United States Patent [19]
Beakes et al.

[11] Patent Number: 5,687,927
[45] Date of Patent: Nov. 18, 1997

[54] ADJUSTABLE STATOR WINDING FORM

[75] Inventors: John M. Beakes, Fairborn; Nathan A. Buckner, Huber Heights, both of Ohio

[73] Assignee: Globe Products Inc., Huber Heights, Ohio

[21] Appl. No.: 667,098

[22] Filed: Jun. 20, 1996

[51] Int. Cl.[6] ............................................. H02K 15/095
[52] U.S. Cl. ............................................. 242/432.6; 29/596
[58] Field of Search ........................... 242/433.4, 433, 242/432.6, 432.4, 432; 29/596

[56] References Cited

U.S. PATENT DOCUMENTS

| | | | |
|---|---|---|---|
| 3,331,562 | 7/1967 | Beaushausen | 242/1.1 |
| 3,345,001 | 10/1967 | Straub et al. | 242/1.1 |
| 3,901,454 | 8/1975 | Reiger, Jr. | 242/1.1 R |
| 4,679,312 | 7/1987 | Nussbaumer et al. | 29/596 |
| 4,732,338 | 3/1988 | Eminger et al. | 242/1.1 R |
| 4,974,313 | 12/1990 | Reiger, Jr. | 242/433.4 |
| 4,982,908 | 1/1991 | Luciani | 242/1.1 R |
| 5,186,405 | 2/1993 | Beakes et al. | 242/1.1 R |
| 5,197,685 | 3/1993 | Banner | 242/1.1 R |
| 5,257,745 | 11/1993 | Lombardi et al. | 242/433.4 |
| 5,340,043 | 8/1994 | Beakes et al. | 242/1.1 R |
| 5,528,822 | 6/1996 | Ponzio et al. | 29/736 |

Primary Examiner—Katherine Matecki
Attorney, Agent, or Firm—Roger S. Dybvig; John J. Cheek

[57] ABSTRACT

In the manufacture of certain stators for dynamoelectric devices, proper spacing between oppositely-facing winding forms of a winding form assembly is determined by the length of a pair of connector rods extending from one winding form to the other. A winding form assembly can be quickly and easily adjusted for use in the manufacture of stators having various stack heights by removal and replacement of the winding form connector rods with connector rods of an appropriate length. The connector rods are locked to one of the winding forms when the connector rods are in a first rotary position and are removable when the connector rods are in a second rotary position. A simple tool can be used to rotate the connector rods between the first rotary position and the second rotary position.

18 Claims, 3 Drawing Sheets

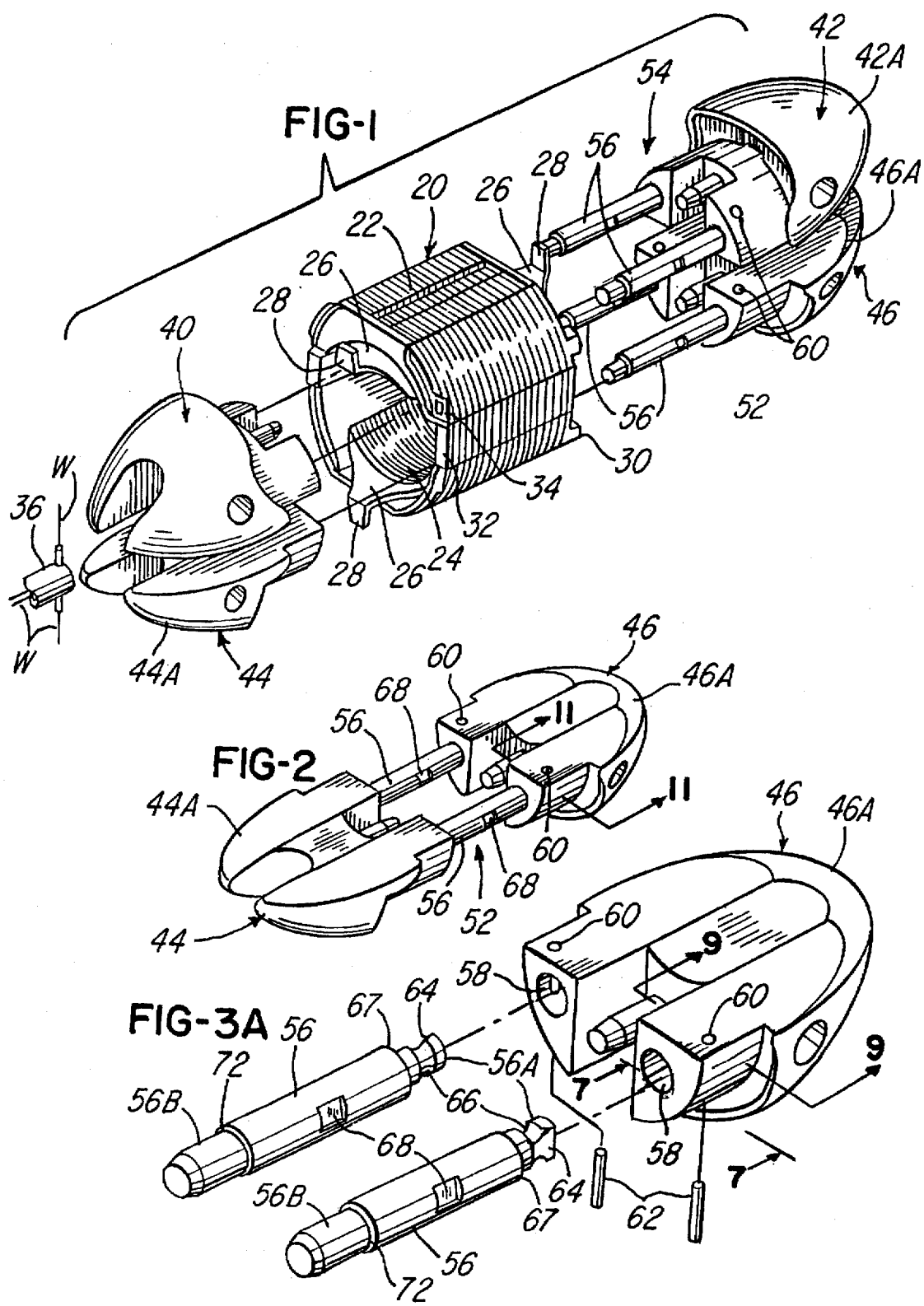

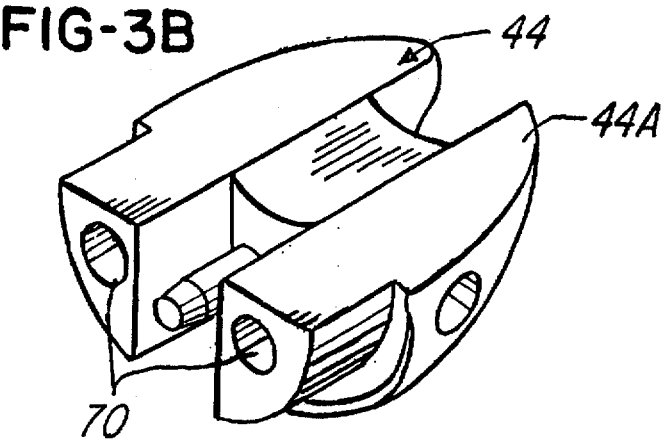
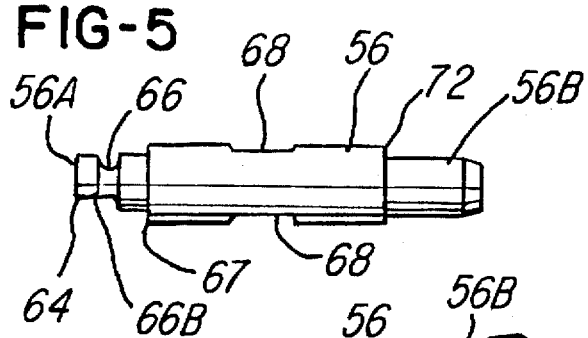
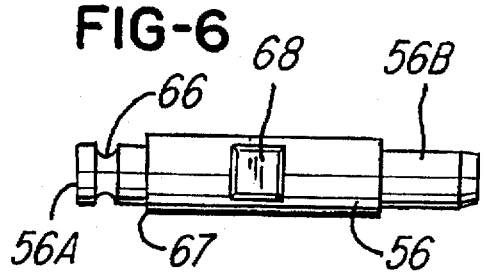
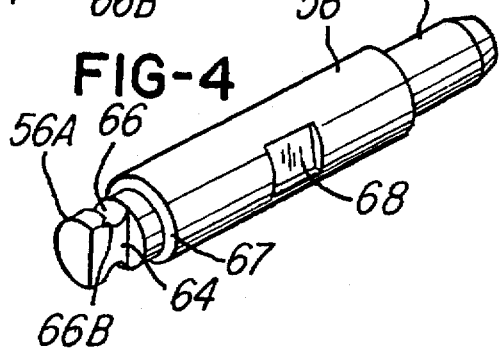
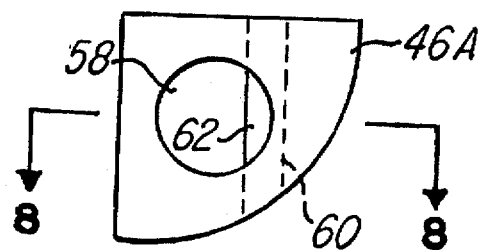
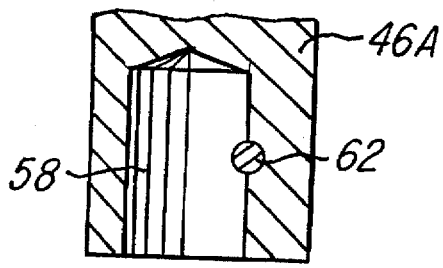

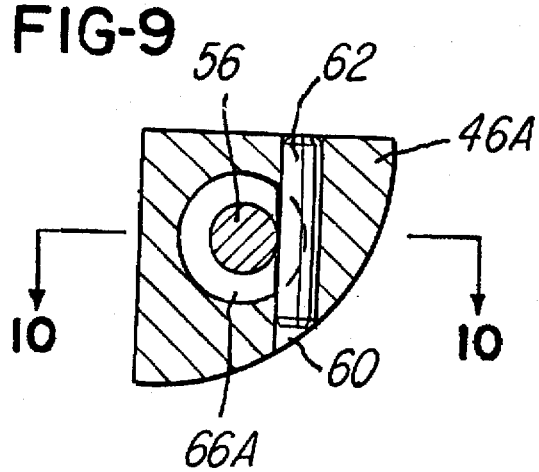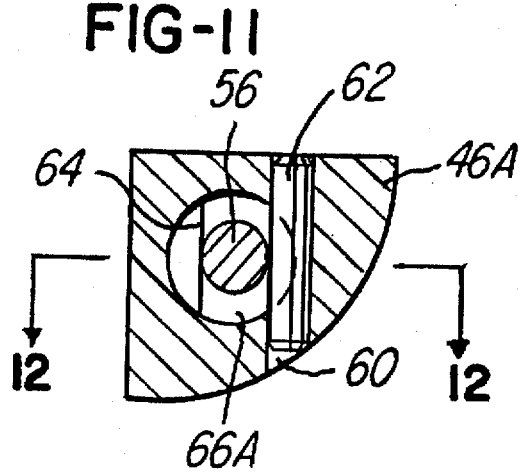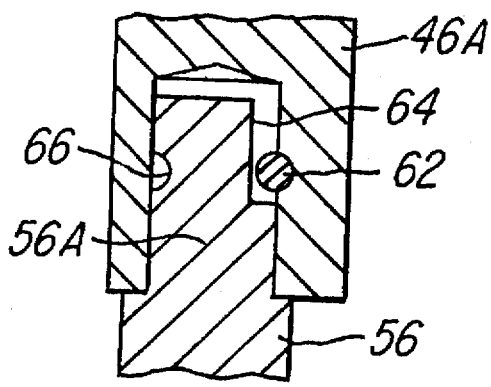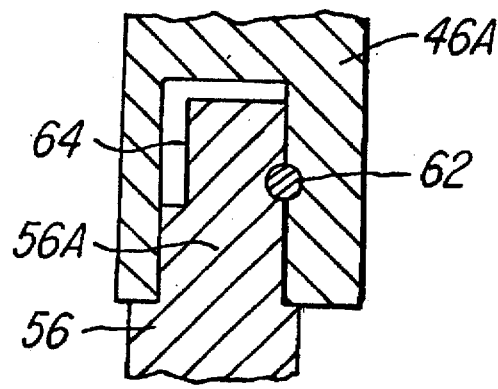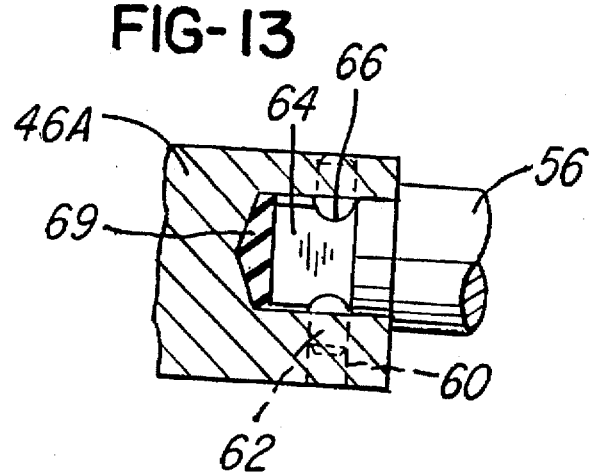

ADJUSTABLE STATOR WINDING FORM

FIELD OF THE INVENTION

This invention relates to an improved winding form for use in the manufacture of stators for dynamoelectric devices. More particularly, this invention relates to a winding form that is readily adjusted for use in the manufacture of stators having various different stack heights.

BACKGROUND OF THE INVENTION

Stators are commonly machine wound such that coils of wire drawn from sources of wire under tension are wound around the stator pole pieces by a reciprocating and oscillating head or ram. The winding head or ram is driven by a mechanism such as that shown in U.S. Pat. No. 4,158,314. A common practice when winding stators in this fashion is to use multiple pairs of oppositely directed shrouds or winding forms, one for each stator pole, that guide the wire segments exiting from the winding head around the pole pieces. The winding forms are commonly secured to the stator by a pair of form retaining clamps or blades, such as shown in U.S. Pat. No. 5,370,324. Alternatively, the oppositely directed winding forms may be clamped to one another as shown in U.S. Pat. No. 5,197,685 or U.S. Pat. No. 5,340,043.

The winding forms of each oppositely directed pair of winding forms are aligned and interfit by a pair of connector rods that extend from the body of one winding form, referred to as a "male" winding form herein, into the body of the other winding form, referred to as a "female" winding form. The connector rods extend through the bore of the stator being wound, and the free or distal ends thereof are slidably received in associated sockets in the body of the female winding form. Typically, the connector rods extending from the body of the male winding form are secured in sockets in the body by set screws.

In certain instances, the stator coils are wound directly around the pole pieces without the use of coil support extensions connected to the pole pieces. In such instances, the winding forms reference against the stator core pole pieces, thereby ensuring the proper spacing between the winding forms regardless of the stack height of the stator being wound. As a result, the connector rods that extend from one winding form to another can be of a single, fixed length, yet the winding forms can be used without adjustment in the manufacture of stators of various different stack heights. The extent to which the free or distal ends of the connector rods are received in the sockets in the female winding forms varies with the stator stack height.

In other instances, the stators have coil support extensions connected to the pole pieces and extending from both end faces of the stator. Such coil support extensions prevent the winding forms from referencing against the pole pieces to provide proper spacing between the winding forms. Instead, shoulders near the free or distal ends of the connector rods abut against a confronting end face of the female winding forms to limit the depth to which the distal ends of the connector rods can be received within the sockets in the female winding forms. As a result, proper spacing between the winding forms is ensured.

The engagement between the shoulders on the connector rods and the confronting face of the female winding form limits the use of the winding forms to the manufacture of stators having a single stack height. To manufacture stators having different stack heights, the connector rods can be removed and replaced with other connector rods of an appropriate length. To this end, each pair of winding forms may be supplied with several sets of connector rods for accommodating different stator stack heights. However, the aforementioned use of set screws to secure the connector rods in sockets in the body of the male winding form makes changeover from one set of connector rods to another tedious and time consuming.

SUMMARY OF THE INVENTION

An object of this invention is to provide a winding form that is readily and rapidly adjusted for use in the manufacture of stators having various stack heights. A related object is to provide such a winding form that can be quickly changed to accommodate different stack heights using only a simple tool.

Another object of this invention is to provide a winding form that accomplishes the foregoing objects in which the need for precision machining and location of the components that permit ready and rapid adjustment of the winding form is minimized.

A male winding form in accordance with this invention comprises a winding form body having a pair of mutually-spaced cylindrical sockets formed therein. A pair of retainer pins extends within the winding form body, one for each socket, and each retainer pin at least partially passes through or intersects its associated socket.

A pair of connector rods projects from the winding form body, one for each socket and associated retainer pin, each connector rod having an end portion thereof received within its associated socket in the winding form body. The end portion of each connector rod has a relieved portion, such as a flat, formed thereon. The relieved portion is sufficiently relieved that the end portion of each connector rod can be moved past the associated retainer pin and out of the associated socket when the connector rod is in a first rotary position relative to its associated socket wherein the relieved portion thereof is in confronting relation to its associated retainer pin. A circumferentially extending groove is also formed in the end portion of each connector rod opposite the relieved portion. The groove receives the associated retainer pin when the connector rod is in a second rotary position.

To assemble each connector rod together with the male winding form body, the proximal end portion of the connector rod is advanced in the first rotary position into its respective socket in the winding form body until the circumferential groove thereof is substantially aligned with the associated retainer pin. Thereafter, the connector rod is rotated to its second rotary position, which may be a half revolution from its first rotary position, which causes the retainer pin to be received in the groove of its associated connector rod. As a result, the connector rod is secured to the winding form body.

With the connector rods secured to the winding form body, the free or distal ends of the connector rods can be inserted into associated sockets in the body of an oppositely-directed female winding form until confronting shoulders on the connector rods engage a confronting end face of the female winding form, thereby providing proper spacing between the winding forms. When stators having a different stack height are to be wound, the connector rods can be removed from the body of the male winding form and replaced with other connector rods of an appropriate length. As evident, each connector rod may be removed by rotating it back to its first rotary position so that the relieved portion of its proximal end is again in confronting relation to the associated retainer pin in the body of the male winding form, at which time the connector rod can be withdrawn from its socket and replaced.

In one embodiment, the connector rods are locked in their sockets by an interference fit between the connector rods and the associated retainer pins. In another embodiment, a resilient member, such as a thin layer of soft durometer polyurethane, is secured at the base of each of the sockets in the body of the male winding form. The resilient members act as springs biasing the connector pins outwardly of their associated sockets, which causes the sidewalls of the grooves in the connector pins to snugly engage their associated retainer pins. The type of biasing member is not critical to this invention. Any suitable bias means capable of being located at the base of each socket, such as a coil spring, ball plunger, or other resilient assembly or material, could be used and should be deemed equivalent for purposes of this invention.

The foregoing and other objects and advantages will become apparent in view of the following description and the accompanying drawings forming a part hereof.

BRIEF DESCRIPTION OF THE DRAWINGS

FIG. 1 is a perspective view of a stator to be wound, a fragment of a winding head used to wind coils of wire onto the stator, and disassembled upper and lower pairs of winding forms in accordance with this invention.

FIG. 2 is a perspective view of the lower pair of winding forms of FIG. 1, namely a male winding form and a female winding form, shown assembled together.

FIG. 3A is an enlarged, partially exploded perspective view of the male winding form of FIG. 2 and shows a pair of connector rods withdrawn from an associated pair of sockets in the body of the male winding form.

FIG. 3B is an enlarged perspective view of the female winding form of FIG. 2, but shown rotated 180 degrees from its position in FIG. 2.

FIG. 4 is a perspective view showing the top, a first or proximal end, and one side of one of the connector rods shown in FIG. 3A.

FIG. 5 is a top plan view of the connector rod of FIG. 4.

FIG. 6 is an elevational view of the side of the connector rod of FIG. 4 opposite to the side thereof shown in FIG. 4.

FIG. 7 is an enlarged end view of a portion of the male winding form of FIG. 3A viewed in the direction of arrows 7—7 thereof.

FIG. 8 is a fragmentary sectional view taken along line 8—8 of FIG. 7.

FIG. 9 is an enlarged sectional view of a portion of the male winding form of FIG. 3A taken along line 9—9 thereof, but showing a connector rod inserted into a socket in the body of the winding form, the connector rod being in the orientation shown in FIG. 3A.

FIG. 10 is a fragmentary sectional view taken along line 10—10 of FIG. 9.

FIG. 11 is an enlarged sectional view of a portion of the male winding form of FIG. 2 taken along line 11—11 thereof. FIG. 11 is similar to FIG. 9 but shows the connector rod rotated a half revolution relative to the body of the male winding form.

FIG. 12 is a fragmentary sectional view taken along line 12—12 of FIG. 11.

FIG. 13 is an fragmentary sectional view of a portion of a second embodiment of a male winding form in accordance with this invention.

DETAILED DESCRIPTION

With reference to FIG. 1, this invention relates to the winding of a two pole stator, generally designated 20, for a dynamoelectric device. The stator 20 includes a substantially hollow, generally cylindrical laminated core 22 formed with a pair of longitudinally-extending, diametrically opposed, pole pieces 24, only one of which is visible in FIG. 1. As is now a common practice, both ends of both pole pieces 24 are provided with longitudinally-extending coil support extensions 26 for supporting the end turns of the stator coils. Each coil support extension 26 has a coil retaining finger 28 projecting generally radially outwardly from the free end thereof, i.e. the end most remote from the end face of the stator core 22. The stator 20 additionally comprises a plastic end plate 30 covering the right end face of the core 22, as viewed in FIG. 1, and the opposite end face is covered by another plastic end plate or terminal board 32 having terminal sockets 34 for terminal posts (not shown), the construction of which is unimportant for purposes of this invention. The coil support extensions 26 are typically integrally formed with the plastic end plates 30 and 32.

Coils of wire (not shown) are wound on the pole pieces 24 by means of a winding head or ram 36, shown in greatly simplified form in FIG. 1, that draws two wires W from sources of wire under tension (not shown). The ram 36 reciprocates through the bore of the stator 20 and oscillates at each end of each reciprocating stroke, as well known, to wind two coils simultaneously, one around each pole piece 24. The ram 36 may be driven by the mechanism shown in U.S. Pat. No. 4,158,314, or by any one of several other mechanisms that have been developed for this purpose.

As is also well known, at the beginning of the winding operations, the free ends of the wires W are gripped by wire clamps (not shown) near the stator 20 and, after the coils are wound, the wire segments leading from the wound coils may be temporarily clamped by other clamps (not shown) in fixed relation to the stator 20 and thereafter connected to terminal posts positioned in the terminal sockets 34. The manner in which the wires are handled, which may be entirely conventional and forms no part of this invention, is not illustrated or further described herein.

Four wire-guiding shrouds or winding forms are shown in FIG. 1, namely a pair of upper winding forms, generally designated 40 and 42, and a pair of lower winding forms, generally designated 44 and 46. Here it may be noted that terms such as upper and lower, left and right, and the like, are used in a relative sense and not in an absolute sense herein. For example, the stator 20 is shown in FIG. 1 as if its longitudinal axis is essentially horizontal but it could be vertical or at some other angle relative to horizontal.

With reference to FIG. 2, the lower pair of winding forms 44 and 46, when assembled together, are interfit to form a lower winding form assembly, generally designated 52. The upper pair of winding forms 40 and 42, shown only in FIG. 1, similarly form an upper winding form assembly, generally designated 54, which is an exact mirror image of the lower winding form assembly 52, as will readily be understood by those familiar with the art. Accordingly, only the lower winding form assembly 52 is further illustrated and described herein. In the remainder of this text, parts of the upper winding form assembly 54 that functionally correspond to parts of the lower winding form assembly 52 described hereafter are identified by the same reference numerals.

Referring to FIGS. 1 and 3A, the right side lower winding form 46 is a male member including a pair of elongate connector rods 56. As shown in FIG. 3A, a first or proximal end portion 56A of each connector rod 56 is slidably received in a cylindrical socket 58 in the body, designated 46A, of the male winding form 46. A pair of bores 60, one for each socket 58, extends through the male winding form body 46A and intersects the associated socket 58 in the winding form body 46A. For reasons which will become apparent and with reference also to FIGS. 7 and 8, a pair of retainer pins 62, one for each bore 60, are press fit into the associated bores 60 so that the retainer pins 62 each pass through and intersect their associated socket 58.

FIGS. 7 and 8, as well as FIGS. 9 through 12, illustrate only one socket 58 and the associated retainer pin 62 of the male winding form body 46A, but it will be understood that the other socket 58 and retainer pin 62 of the male winding form body 46A are substantially a mirror image thereto. Therefore, only one socket 58 and its associated connector pin 62 are discussed in further detail herein. Furthermore, FIGS. 7 and 8 illustrate the retainer pin 62 passing vertically through the right side of the socket 58, but it will also be understood that the retainer pin 62 could pass through the socket 58 at another circumferential location or with a different attitude relative to the socket 58. Still further, the precise locations of the sockets 58 within the male winding form body 46A will be dictated by the geometry of the stator core being wound and may be somewhat different from their locations illustrated in the drawings.

Referring still to FIGS. 7 and 8, the retainer pin 62 obstructs a portion of the socket 58, which would prevent the proximal end portion 56A of the connector rod 56 from being advanced into the socket 58 if the proximal end portion 56A were entirely cylindrical, as at the free or distal end 56B thereof. To permit the proximal end portion 56A of the connector rod 56 to be inserted into the socket 58 in the male winding form body 46A, the proximal end portion 56A of the connector rod 56 is relieved or cut away to form a flat 64 thereon inwardly of the outside diameter of the otherwise cylindrical proximal end portion 56A of the connector rod 56. The flat 64 is formed by machining away a portion of the otherwise cylindrical proximal end portion 56A of the connector rod 56. As evident, the flat 64 is machined inwardly from the outside diameter of the proximal end portion 56A of the connector rod 56 to slightly more than the extent to which the associated connector pin 62 obstructs the associated socket 58 to provide clearance therebetween on the order of 0.0005" to 0.0015". It will be understood that the proximal end portion of the connector rod could be relieved or cut away in other than a flat configuration, so long as it is sufficiently relieved to provide clearance between the relieved portion and the associated connector pin 62.

With reference to FIGS. 3A, 9 and 10, the proximal end portion 56A of a connector rod 56 may be advanced or inserted into a socket 58 when the flat 64 is aligned with and confronts the associated retainer pin 62. To permit the connector rod 56 to be secured or locked in the socket 58, the proximal end portion 56A of the connector rod 56 has a peripheral, transverse semicircular groove 66 formed therein opposite the flat 64. The dimensions of the groove 66 correspond substantially to the dimensions of the portion of the retainer pin 62 that passes through or intersects the socket 58.

With reference also to FIGS. 11 and 12, the proximal end portion 56A of the connector rod 56 is advanced into the socket 58 until the groove 66 therein is substantially aligned with the retainer pin 62. Preferably, such substantial alignment is provided by a shoulder 67 spaced from the groove 66 and facing the male winding form body 46A, which shoulder 67 abuts against a confronting end face 47 of the male winding form body 46A to properly align the groove 66 and the retainer pin 62. Although not preferred, the groove 66 and the retainer pin 62 could also be aligned when the proximal end portion 56A of the connector rod 56 engages or bottoms out against the base of the socket 58.

With the groove 66 and the retainer pin 62 at least substantially aligned, as best shown in FIG. 10, the connector rod 56 is rotated relative to the male winding form body 46A so that the retainer pin 62 is received within the groove 66. Preferably, the connector rod 56 is rotated by a half revolution so that the flat 64 faces away from, but is still aligned with, the retainer pin 62. Of course, it will be evident to one skilled in the art that a half revolution is not necessary so long as the retainer pin 62 is received within the groove 66. The confronting relationship between the retainer pin 62 and a wall 66A of the groove 66, which wall 66A is closest to the base of the socket 58, prevents the connector pin 56 from being withdrawn from the socket 58.

As evident, other connector pins 56 are similarly inserted into and locked in the other socket 58 in the lower male winding form body 46A and the sockets 58 in the upper male winding form body, designated 42A.

With reference to FIGS. 1 through 6, each connector rod 56 has a pair of opposed flats or keyways 68 formed centrally thereon. The flats or keyways 68 are adapted to receive a simple tool such, as a pair of pliers or a crescent wrench which acts a key, so that the connector rods 56 may be readily rotated relative to the male winding form body 46A. In addition, the flats or keyways 68 serve as indicators so that the worker assembling a connector rod 56 together with the male winding form body 46A can readily discern the location or orientation of the flat 64 within the socket 58. Alternatively, a transverse aperture (not shown) could be provided extending through the central portion of each connector rod 56 to receive a simple tool, such as a screwdriver, allen wrench, or the like, which would provide leverage to rotate the connect rod 56. Because the particular configuration of the apertures is unimportant for purposes of this invention, hex, slot, cylindrical, or any other suitable configuration could be used.

To ensure that each connector rod 56 remains secure in its associated socket 58 and resists any tendency to rotate, an interference fit is preferably provided between the groove 66 in the proximal end portion 56A of the connector rod 56 and the associated retainer pin 62 so that the connector rod 56 is held snugly in the socket 58. Such interference fit is provided by forming the groove 66 so that it is slightly misaligned with the associated retainer pin 62 when the shoulder 67 on the connector rod 56 abut against the confronting end face 47 of the male winding form body 46A. The misalignment is created by forming the groove 66 at a distance from the shoulder 67 which is slightly less than the distance between the end face 47 of the winding form body 46A and the retainer pin 62, thereby creating an offset between the groove 66 and the retainer pin 62. Accordingly, simple rotation of the connector rod 56 will not result in the retainer pin 62 being received in the groove 66 in the proximal end portion 56A of the connector rod 56.

The particular dimensions of the connector rod 56 and the winding form body 46A are dependent upon the stator being wound. However, a male winding form 46 has been constructed wherein the distance from the confronting end face 47 of the winding form body 46A to the margin of the retainer pin 62 closest to the base of the socket 58 is 0.3089", the proximal end portion 56A of the connector rod 56 is 0.47" long, and the distance from the confronting shoulder 67 of the connector rod 56 to the margin of the groove 66 therein most distant from the shoulder 67 is 0.3087". Thus, when the shoulder 67 abuts against the confronting end face of the winding form body 46A, the groove 66 and the retainer pin 62 are axially offset by 0.0002".

With reference particularly to FIG. 5, each end of the groove 66 opening to the flat 64 on the proximal end of each connector rod 56 has a camming surface 66B angled toward the proximal end of the connector rod 56 at a small angle on the order of 15 degrees. When the connector rod 56 is rotated relative to the male winding form body 46A, one of the camming surfaces 66B bears against the associated retainer pin 62. Upon, further rotation of the connector rod 56, the camming surface 66B deflects or bows the retainer pin 62 so that it becomes fully or exactly aligned with the groove 66 and is received therein. The deflected or bowed retainer pin 62 acts as a spring biasing the connector rod 56 inwardly of the associated socket 58 and prevents rotation of the connector rod 56 relative to the male winding form body 46A. As apparent, rotation of the connector rods 56 will require the use of a suitable tool to provide leverage, as described above, to overcome the interference resulting from the above-described offset between the groove 66 and the retainer pin 62.

In order to obtain satisfactory locking of the connector rod 56 within the socket 58 using the interference fit described above, the location of the retainer pin 62 within the male winding form body 46A and the location of the groove 66 in the proximal end portion 56A of the connector rods 56 relative to the shoulder 67 thereon must meet exacting tolerances to create the 0.0002" offset mentioned above. If an interference fit is not used, which would reduce the need for such exacting tolerances, it is contemplated that a suitable bias means will be disposed at the base of each socket 58 to bias each connector rod 56 outwardly of its respective socket 58. Such biasing will cause the sidewalls 66A of the grooves 66 to tightly or snugly engage the retainer pin 62 received therein.

FIG. 13 illustrates a portion of a second embodiment of a male winding form 46 in accordance with this invention utilizing a bias means at the base of each socket 58 as described above. The preferred bias means comprises a thin pad or layer of resilient material 69 disposed at the base of each socket 58. Presently, a soft durometer polymer, such as polyurethane, is preferred, although other resilient materials, such as rubber, could be used. The particulars of the bias means are unimportant for purposes of this invention, so long as the bias means is capable of being disposed at the base of each socket 58. Therefore, any suitable bias means, such as a coil spring, a ball plunger, or other structure or assembly with resilient characteristics, could be used and should be considered equivalent for purposes of this invention.

The use of a suitable bias means will somewhat reduce the tendency of the connector rods 56 to rotate relative to the male winding form body 46A by virtue of the resulting snug engagement of the groove sidewalls 66A with the retainer pins 62. In addition, a thin layer of soft durometer polyurethane or similar material at the base of each socket 58 will frictionally engage the proximal end portion 56A of each connector rod 56, further reducing the tendency of the connector rods 56 to rotate.

With reference to FIG. 1, after the connector rods 56 are assembled together with the male winding form body 46A, the male winding form 46 and the female winding forms 44 may be assembled together on the stator 20 to form the lower winding form assembly 54 mentioned above. The winding forms 44 and 46 are moved into position relative to the stator 20 by a suitable carriage (not shown), as well known, so that the connector rods 56 of the male winding form 46 are positioned to pass through the bore of the stator 20 and are aligned with the sockets 70 in the female winding form body, designated 44A, the sockets 70 being best shown in FIG. 3B. The male winding form 46 and the female winding form 44 are then brought together so that the distal ends 56B of the connector rods 56 are slidably received within the sockets 70 in the female winding form body 44A. It will be understood the upper winding form assembly 52 is assembled together on the stator 20 in a similar manner.

As mentioned above, the distal ends 56B of the connector rods 56 have confronting shoulders 72 formed thereon facing the female winding form 44. As the distal ends 56B of the connector rods 56 are inserted into the sockets 70 in the female winding form body 44A, the shoulders 72 on the connector rods 56 engage and abut against a confronting end face, designated 45, of the female winding form body 44A. As a result, the depth to which the distal ends 56B of the connector rods 56 are received within the sockets 70 in the female winding form body 44A is limited by the shoulders 72 on the connector rods 56, thereby determining the separation between the female winding form 44 and the male winding form 46.

When stators 20 having different stack heights are to be wound, the connector rods 56 can be removed from the male winding form body 46A and replaced with connector rods 56 of an appropriate length. As evident, the connector rods 56 may be removed by rotating the connector rods 56, such as by use of a suitable simple tool as described above, by a half revolution (or whatever angle is appropriate) relative to the male winding form body 46A so that the flats 64 on the proximal end portions 56A of the connector rods 56 are again aligned with and confront the associated retainer pins 62 in the male winding form body 46A, at which time the connector rods 56 can be withdrawn from their sockets 58 and replaced as described above. As evident, the connector rods 56 can be rotated in either the clockwise direction or the counterclockwise direction.

Although the presently preferred embodiments of this invention have been described, it will be understood that within the purview of the invention various changes may be made within the scope of the following claims.

Having thus described our invention, we claim:

1. A winding form for use in the manufacture of stators for dynamoelectric devices, comprising:

a winding form body having at least one longitudinally-extending socket formed therein;

at least one connector rod projecting from said winding form body, one for each socket, each connector rod having an end portion thereof received within its associated socket;

means associated with each connector rod for retaining the end portion thereof within its associated socket when said each connector rod is in a first rotary position relative to its associated socket; and means associated with each connector rod permitting the removal of said each connector rod from its associated socket when said each connector rod is rotated to a second rotary position relative to its associated socket.

2. A winding form for use in the manufacture of stators for dynamoelectric devices, comprising:

a winding form body having at least one longitudinally-extending cylindrical socket formed therein;

at least one retainer pin extending within said winding form body, one for each socket, and intersecting its associated socket; and at least one connector rod projecting from said winding form body, one for each socket and associated retainer pin, each connector rod having an end portion thereof received within its associated socket and having both (a) a relieved portion sufficiently relieved that said end portion can be moved past the associated retainer pin and out of the associated socket when said each connector rod is in a first rotary position relative to its associated socket wherein the relieved portion thereof is in confronting relation to its associated retainer pin and (b) a circumferentially extending groove formed in the end portion thereof opposite said relieved portion that receives the associated retainer pin when said each connector rod is in a second rotary position.

3. The winding form of claim 2 wherein said first rotary position and said second rotary position are angularly spaced by 180 degrees.

4. The winding form of claim 2 wherein said winding form body has two longitudinally-extending sockets formed therein, and further comprises two retainer pins and two connector rods, one of each for each socket.

5. The winding form of claim 2 wherein each socket has a base, and further comprising bias means disposed at the base of each socket for biasing the associated connector rod axially-outwardly of its associated socket.

6. The winding form of claim 5 wherein the circumferential groove of each connector rod has a sidewall, and wherein the bias means at the base of each socket biases the groove sidewall of the associated connector rod into snug engagement with its associated retainer pin when said associated connector rod is in the second rotary position.

7. The winding form of claim 5 wherein the bias means at the base of each socket also inhibits rotation of the associated connector rod relative to its associated socket.

8. The winding form of claim 7 wherein the bias means at the base of each socket comprises a layer of resilient material.

9. The winding form of claim 2 wherein each connector rod has a shoulder formed thereon at an axially-spaced distance from the circumferential groove therein, and wherein the circumferential groove of each connector rod is substantially aligned with its associated retainer pin when the shoulder of said each connector rod engages a confronting end face of said winding form body.

10. The winding form of claim 2 wherein each connector rod has a shoulder formed thereon at an axially-spaced distance from the circumferential groove therein, and wherein the circumferential groove of each connector rod is slightly misaligned with its associated retainer pin when the shoulder of said each connector rod engages a confronting end face of said winding form body, and wherein the end portion of each connector rod has a camming surface that, upon rotation of said each connector rod from said first rotary position to said second rotary position, deflects the associated retainer pin into exact alignment with the groove in the end portion of said each connector rod so that the associated retainer pin can be received in the groove in said each connector rod.

11. The winding form of claim 2 wherein each connector rod has means for engagement by a simple tool for rotating said each connector rod relative to its associated socket between the first rotary position and the second rotary position.

12. A method for assembling a winding form, said winding form comprising a winding form body and at least one connector rod extending therefrom, said winding form body having at least one longitudinally-extending, cylindrical socket formed therein, one for each connector rod, for receiving a generally cylindrical end portion of its associated connector rod, said method comprising:

providing at least one retainer pin, one for each socket and associated connector rod, extending within said winding form body and intersecting the associated socket therein;

providing a relieved portion on the cylindrical end portion of each connector rod, said relieved portion of each connector rod being sufficiently relieved that said end portion can be moved into its associated socket past the associated retainer pin when said each connector rod is in a first rotary position relative to its associated socket wherein the relieved portion thereof is in confronting relation to its associated retainer pin;

providing a circumferential groove extending around each connector rod opposite the relieved portion thereof;

with each connector rod in its first rotary position, advancing the end portion of said each connector rod into its associated socket until the circumferential groove in said each connector rod is substantially aligned with its associated retainer pin; and rotating each connector rod about its longitudinal axis to a second rotary position wherein the circumferential groove in said each connector rod receives its associated retainer pin.

13. The method of claim 12 wherein each connector rod has a shoulder formed thereon at an axially-spaced distance from the circumferential groove therein facing said winding form body, and wherein said step of advancing each connector rod comprises advancing each connector rod until the shoulder formed thereon engages a confronting end face of the winding form body.

14. The method of claim 13 wherein said rotating step is carried out with respect to each connector rod by manipulating said each connector rod with a simple tool.

15. The method of claim 13 wherein the groove in the end portion of each said connector rod and the associated retainer pin are substantially aligned but still slightly misaligned when the shoulder of said each connector rod engages the confronting face of said winding form body, and wherein said rotating step causes each said retainer pin to be deflected into exact alignment with groove in its associated connector rod.

16. A winding form assembly for use in the manufacture of stators for dynamoelectric devices, comprising:

a first winding form comprising:

a winding form body having at least one longitudinally-extending cylindrical socket formed therein, at least one retainer pin extending within said winding form, one for each socket, and intersecting its associated socket, and at least one connector rod projecting from said winding form body, one for each socket and associated retainer pin, each connector rod having a first end portion thereof received within its associated socket and having both (a) a relieved portion sufficiently relieved that said end portion can be moved past the associated retainer pin and out of the associated socket when said each connector rod is in a first rotary position relative to its associated socket wherein the relieved portion thereof is in confronting relation to its associated retainer pin and (b) a circumferentially extending groove formed in the first end portion thereof opposite said relieved portion that receives the associated retainer pin when said each connector rod is in a second rotary position; and a second, oppositely-facing winding form comprising a winding form body having at least one longitudinally-extending cylindrical socket formed therein, one for each connector rod, wherein a second, opposite end portion of each connector rod is removably received within the associated socket in said second winding form body.

17. The winding form assembly of claim 16 wherein each connector rod has a shoulder facing said second winding form that engages a confronting end face of said second winding form body.

18. The winding form assembly of claim 17 wherein the distance between the first winding form and the second winding form, when the shoulder on each connector rod engages the confronting end face of the second winding form body, can be adjusted by removing each connector rod from the first winding form body and replacing it with another connector rod having the shoulder thereon at a different distance from the first end portion thereof.

* * * * *